United States Patent [19]

Sakauchi et al.

[11] 3,962,181

[45] June 8, 1976

[54] PROCESS FOR PREPARATION OF POLYPHENYLENE OXIDES

[75] Inventors: Takashi Sakauchi; Akiyoshi Somemiya; Satoshi Tonoki, all of Kobe, Japan

[73] Assignee: Kanegafuchi Kagaku Kogyo Kabushiki Kaisha, Osaka, Japan

[22] Filed: May 13, 1974

[21] Appl. No.: 469,188

Related U.S. Application Data

[63] Continuation of Ser. No. 203,297, Nov. 30, 1971, abandoned.

[30] Foreign Application Priority Data

Dec. 1, 1970  Japan............................... 45-106520

[52] U.S. Cl........................... 260/47 ET; 260/613 R
[51] Int. Cl.².......................................... C08G 61/10
[58] Field of Search................................ 260/47 ET

[56] References Cited

UNITED STATES PATENTS

| 3,306,875 | 2/1967 | Hay.................................. 260/47 ET |
| 3,337,501 | 8/1967 | Bussink et al.................... 260/47 ET |

FOREIGN PATENTS OR APPLICATIONS

| 1,486,618 | 5/1967 | France............................ 260/47 ET |

OTHER PUBLICATIONS

Arakawa et al., Kogyo Kagaku Zasshi, 72, 1969, pp. 1739–1743.
Shono et al., Ibide, 70, 1967, pp. 2062–2066.

*Primary Examiner*—Lucille M. Phynes
*Attorney, Agent, or Firm*—Moonray Kojima

[57] ABSTRACT

A process for preparing polyphenylene oxides by oxidizing a nuceus substituted phenol with oxygen in the presence of a basic manganese chelate compound.

12 Claims, 2 Drawing Figures

PROCESS FOR PREPARATION OF POLYPHENYLENE OXIDES

This is a continuation, of application Ser. No. 203,297, filed Nov. 30, 1971, now abandoned.

BACKGROUND OF THE INVENTION

This invention relates to a process for preparation of polyphenylene oxides using chelate compounds.

There are a number of known methods of preparing polyphenylene oxides using metal chelate compounds. One example is a method using a catalyst comprising a manganese, cobalt or copper salt and an alkali metal alcoholate or phenolate, such as disclosed in Belgian Pat. No. 712,845. Another example is a method employing a catalyst comprising a manganese salt, an alcohol and a tertiary amine, such as disclosed in Belgian Pat. No. 710,263. A further example is a method using a basic cupric salt, such as disclosed in Japanese Patent Publication No. 18692/61. A still further example is a method using a cobalt (II) chelate compound represented by the Registered Trademark "Salcomine", which is disclosed in Japanese Patent Publication No. 22154/70. The "Salcomine" is a chelate compound composed of a condensate of two molecules of salicyl aldehyde with one molecule of ethylene diamine[N,N'-ethylenebis(salicylidene imine)]and cobalt (II). It is known that this compound absorbs and liberates oxygen reversibly.

As is shown in the Comparative Examples given below, these known methods are defective and leave much to be desired. They have low reaction rates. Thus, to obtain a polymer having a high degree of polymerization, the reaction must be conducted for a long period of time. From a commercial point of view this is unacceptable. The productivity and hence cost would be adversely affected.

The method using a basic cupric salt has numerous disadvantages. For example, a large quantity of aniamine must be used. Moreover, diphenoquinone is readily formed as a by-product. Also, the catalyst is deactivated by water formed by the reaction. Furthermore, coloration is caused to occur by the amine remaining in the resulting polymer.

Furthermore, when using the "Salcomine" catalyst, it is difficult to maintain the quality of the catalyst at a uniform level, although the same synthesis method is used. Therefore, the method using this "Salcomine" catalyst does not readily produce polymers having uniform quality, because of the relatively large degree of unevenness in the activity of the catalyst.

SUMMARY OF INVENTION

An object of the invention is to overcome the aforementioned defects and disadvantages inherent in the prior art methods.

The invention encompasses a method of preparing polyphenylene oxides by oxidizing and condensing a phenol having a formula such as described below in the presence of a manganese chelate compound having a formula such as described below. Further details, advantages, objects and features are fully set forth below.

Advantageously, the resulting polymers have excellent thermal, mechanical, electrical and chemical properties. Thus, they may be used in a wide variety of areas.

DETAILED DESCRIPTION OF PREFERRED EMBODIMENTS

Figure 1:
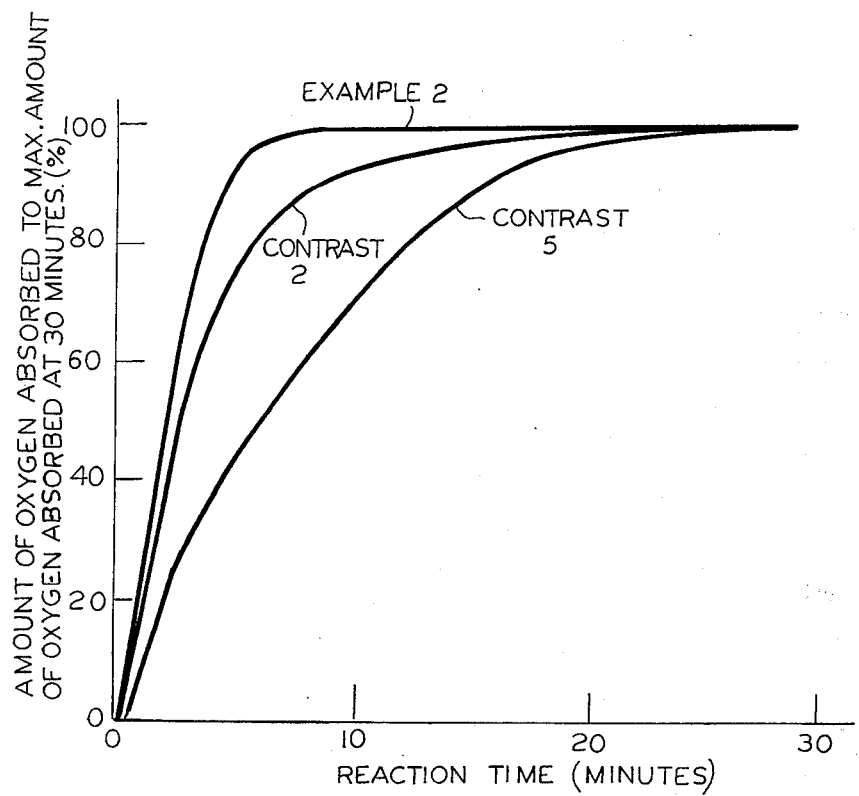
FIG. 1 is a graph illustrating the ratios of amounts of absorbed oxygen, at prescribed reaction times, to amounts of oxygen absorbed at the reaction time of 30 minutes, namely, the maximum amount of oxygen absorbed.

Polymers prepared according to this invention have a recurring structure expressed by the following formula (1):

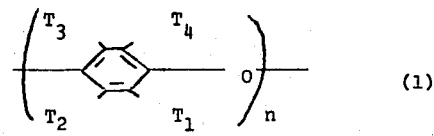

wherein $T_1$, $T_2$, $T_3$ and $T_4$ are substituents which will be described below.

The polymers are important high molecular materials having excellent thermal, mechanical, electrical and chemical properties.

The catalyst used in this invention is a basic, manganese chelate compound represented by the following formula (2):

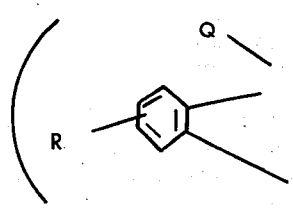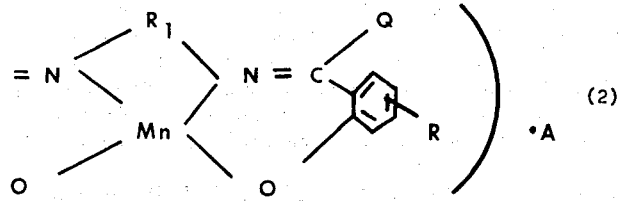

wherein $R_1$ stands for ethylene, hexamethylene, and o-phenylene groups, Q stands for a hydrogen atom or a hydrocarbon group, R stands for a hydrogen atom, a hydrocarbon group, a hydrocarbon-oxy group, a halogen atom, an amino group, and A stands for a ethylene diamine.

It has already been disclosed in L. H. Vogt, H. L. Finkbeiner et al. "Journal of Organic Chemistry", (34) (2), 273 (1969) that chelate compounds formed by substituting the cobalt atom of the "Salcomine" compound by manganese, iron, nickel or copper, exhibit no activity under conditions where the "Salcomine" can oxidize and condense phenols. Therefore, it is impossible to anticipate that the basic manganese chelate compound of this invention will exhibit a very high activity for oxidative condensation of phenols. Hence, this invention substantially advances the art.

In the practice of this invention, it is preferred that the basic manganese chelate compound to be used act sufficiently stable under conditions for oxidative condensation of phenols, which will be detailed below. In view of such stable action, it is preferred that $R_1$ in the above formula (2) not be a group having too long a chain (for example, decamethylene group and the like), because such a long chain group reduces the stability of the catalyst. Further, in case R is a highly hydrophilic atom or atomic group (for example, sulfonic acid group and the like), the solubility of the basic manganese chelate compound in organic solvents is lowered substantially. Thus, R as such highly hydrophilic atom or atomic group should be avoided.

The attainment of the highly active state of the chelate compound depends, it is thought, on the atomic group represented by A in the above formula. As described above, A is ethylene diamine.

Examples of $R_1$, Q, R and A in formula (2), giving especially preferred basic manganese chelate compounds are: ethylene, hexamethylene and o-phenylene groups as $R_1$; hydrogen atom and methyl group as Q; hydrogen atom, chlorine atom, methyl group and methoxy group as R; and ethylene diamine as A. Typical examples of preferred chelate compounds are ethylene diamine complexes, of N,N'-ethylene-bis(salicylidene iminate) manganese, N,N'-ethylene-bis(3-methoxysalicylidene iminate) manganese and N,N'-ortho-phenylene-bis(5-chlorosalicylidene iminate) manganese.

Processes for synthesis of the basic manganese chelate compounds to be used in this invention have been known in the art. For instance, they are usually synthesized by reacting under heat, a manganese salt, an amine, and salicyl aldehyde or its derivative with ethylene diamine in an organic solvent or water, or by forming a Schiff base in advance by subjecting a diamine and salicyl aldehyde or its derivative to hydrating condensation and then reacting it with a manganese salt and ethylene diamine in a solvent. By these synthesis methods, the basic manganese chelate compounds are obtained in the form of solids or catalytic solutions.

The amount of catalyst used varies, depending upon the reaction conditions (such as temperature, kind of solvent, solvent composition, pressure and other factors) and on the degree of polymerization desired in the resulting polymer. Thus, it is impossible to specify in a generalized simple manner the amount of catalyst to be used. However, good results are generally obtainable when the catalyst is used in an amount of 0.1 mole % or more based on the phenol, which will be detailed below.

The Japanese Patent Publication 22154/70, wherein is disclosed a method of using chelate compounds of the "salcomine" type, teaches that in continuous polymerization it is advantageous to use higher concentrations of catalysts, up to 10 mole percent, whereas in the process of this invention, using continuous polymerization, it is sufficient that the catalyst be used in such a low concentration as below 10 mole % to 0.1 mole percent, and preferably 1 to 3 mole percent. Thus, higher productivity is attained in the process of this invention.

Phenols to be used in this invention have the following general formula (1)

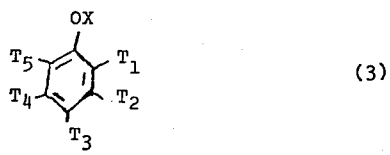

(3)

wherein X stands for hydrogen, and $T_1$, $T_2$, $T_3$, $T_4$ and $T_5$ stand for at least hydrogen atom, a hydrocarbon group, and/or a hydrocarbon-oxy group, said groups being free of aliphatic tertiary alpha-carbon atom.

Specific examples of $T_1$, $T_2$, $T_3$, $T_4$ and $T_5$ include hydrogen, atoms, and methyl, ethyl, propyl, propenyl, phenyl, methoxy, ethoxy, phenoxy, groups, etc. As typical examples of the above formula phenols there are o-cresol, 2,6-dimethylphenol, 2,6-diethylphenol, 2,6-dimethoxyphenol, 2,6-dipropenylphenol, 2,6-diphenylphenol, 2,4,6-trimethylphenol, 3-methoxyphenol, and the like. They may be used singly or in admixtures of two or more.

In practicing this invention, it is not always necessary to use a solvent. However, in the absence of a solvent, the viscosity of the reaction mixture increases with advance of the reaction and hence, diffusion of oxygen as an oxidant, which will be described below, is inhibited, with the result that a polymer of a high degree of polymerization cannot be readily obtained. Moreover, re-dissolving and precipitating steps are required for recovering the catalyst from the resulting polymer. For these reasons, the method which does not use a solvent is of little significance from the commercial viewpoint. It is preferable to practice the process with use of a solvent.

Almost any organic solvent may be used in this invention. More specifically, there may be used aromatic and substituted aromatic hydrocarbons such as benzene, toluene, xylene, anisol, chlorobenzene, dichlorobenzene, bromobenzene, nitrobenzene and benzonitrile; ketones such as acetone and methylethylketone; esters such as ethyl acetate and amyl acetate; alcohols such as methanol, ethanol, propanol, isopropanol and butanol; halogenated hydrocarbons such as chloroform, methylene chloride, 1,2-dichloroethane, methyl chloroform, 1,1,2-trichloroethane and 1,1,2,2-tetrachloroethane; ethers such as tetrahydrofuran and dioxane; and amides such as dimethyl formamide, dimethyl acetamide and hexamethyl phosphoamide.

Some of the aforementioned solvents do not dissolve well the basic manganese chelate compound used as the catalyst or the resulting polyphenylene oxide. In this case, the reaction is allowed to advance at the catalyst concentration determined by the solvent, or a polymer which comes to have a degree of polymerization determined by the solvent forms a separate phase in the reaction mixture. For example, although the catalyst is not sufficiently dissolved in benzene, upon addition of the starting phenol the reaction system becomes homogeneous and the catalyst precipitates in the form of solids with the advance of the reaction, while the polymer is obtained in a state dissolved in benzene. Accordingly, in such a case, it is possible to recover the catalyst by filtering the reaction mixture and to restore the catalyst to its original state. However, these procedures are complex and not preferred. Thus, it is especially preferred to use various solvents in the form of admixtures.

Good results are obtained by employing a combination of an aromatic or substituted aromatic hydrocarbon or halogenated hydrocarbon which is a good solvent for the polymer, with an alcohol or other solvent which is a good solvent for the catalyst and can also act as a diluent for water formed by the reaction. If such combination is employed, since an alcohol does not dissolve the polymer, when the polymer comes to have a degree of polymerization determined by the composition of the mixed solvent, it forms a separate phase and precipitates in the form of particles. When such separate phase is formed, a degree of polymerization does not, or hardly does, increase in the known catalyst systems.

For example, in the case of a copper-amine complex, even if an alcohol is used in combination with a good solvent for the polymer, the degree of polymerization of the precipitated polymer does not increase when it is allowed to stand still in the reaction system for a long time (see Comparative Example 7). Again in the case of a catalyst of the "Salcomine" type, the above-mentioned patent disclosing the catalyst suggests that a polymer having a certain degree of polymerization is obtained by forming a separate phase, and it is readily presumed that the degree of polymerization hardly changes in the polymer which has formed such separate phase.

In contrast, surprisingly, it has been unexpectedly found that in case the catalyst of this invention is used, the polymer which has already formed a separate phase still undergoes continuously, the oxidizing coupling reaction and is converted promptly to a polymer of a high molecular weight. In view of the fact that the degree of increase in the degree of polymerization is very conspicuous, the inventors concluded that at the above stage, the oxidizing coupling reaction at the polymer head (phenol end) and at the polymer tail (phenyl end) dominates over the quinol-ether equilibrium reaction. This phenomenon makes it possible to obtain a polymer of a very high degree of polymerization within a short time and with use of a small quantity of catalyst. This is a prominent feature of this invention.

Although the resulting polymer contains a very small amount of catalyst, since the catalyst is very easily soluble in an alcohol, it can be readily removed from the polymer. Thus, advantageously, the resulting polymer is substantially free of impurities.

The reaction liquor, from which the polymer has been separated, is incorporated with a fresh catalyst corresponding to the catalyst which accompanied the polymer and was excluded, and then is subjected to treatment with a dehydrating agent which will be described below, following which steps the starting phenol is added thereto and the polymerization is again conducted.

Addition of a basic substance such as amines, diamines, amides, is effective in increasing the reaction rate, thereby further heightening the molecular weight of the polymer and elevating the selectivity of the oxidation reaction. Use of such basic substances is not always necessary, howeve, because the catalyst of this invention is highly active and exhibits a high selectivity of the oxidation reaction. In case such basic substance is used, it is advantageous to use it in an amount of at least ½ mole per mole of the catalyst. However, it is preferred to use it in not too great an amount (for example, in an amount similar to the reaction solvent), because the lowering in the reactivity is likely to occur because the basic substance exhibits a higher coordination to the manganese chelate compound than to the starting phenol.

The reaction temperature should be determined, depending on the reaction rate and the selectivity of the reaction. It is generally preferred to conduct the reaction at temperatures not exceeding 100°C. At higher temperatures, the reaction rate may be heightened but side reactions such as formation of quinones are readily caused to occur. Moreover, the reaction should not be conducted at termperatures exceeding the boiling point under the reaction conditions of the solvent used, because boiling of the solvent prevents the dissolution of oxygen into the reaction liquor, which will be described below.

The use of a dehydrating agent inhibits the deactivation of the catalyst (oxidation to manganese dioxide and conversion to an inactive chelate) and brings about good results. Generally, as the dehydrating agent there may be used molecular sieve, alumina, silica gel and the like.

As the oxidant, there may be used oxygen, air and oxygen diluted with an inert gas. In general, use of oxygen establishes a reaction system exhibiting a maximum reaction rate. In case easy control of the reaction is desired, it is preferable to use diluted oxygen. Although reacting oxygen under high pressure contributes to increasing the reaction rate, since the catalyst of this invention is sufficiently active, such high pressure is not absolutely necessary. The termination of the reaction may be known from substantial stopping of consumption of oxygen and/or of stopping of heat generation.

According to this invention, since the intended polymer having a high degree of polymerization can be obtained within a short time, use of a large quantity of amine is not required, and no deactivitation of the catalyst is brought about.

This invention will now be described in further detail with reference to actual examples.

COMPARATIVE EXAMPLE 1

2.0 gm (0.05 mole) of sodium hydroxide was dissolved, under heat, into 122 gm (1.0 mole) of 2,6-dimethylphenol, and the mixture was added to 2200 gm of 1,2-dichloroethane. After 32.5 gm (0.1 mole) of "Salcomine" had been added to the mixture, oxygen was introduced thereinto at 30°C.

Upon initiation of the reaction, the temperature was elevated. The temperature increase was controlled by cooling so that the temperature of the reaction system was maintained at 30°C. After the introduction of oxygen had been continued for 1 hour, the reaction mixture was filtered, and the filtrate was poured into 20 liters of hydrochloric acid-containing methanol to precipitate the polymer. The precipitated polymer was recovered by filtration, washed with methanol, and dried in vacuo at 110°C. The amount of polymer obtained was 55.9 gm (yield being 45.8%), and the intrinsic viscosity of the polymer was 0.18 (calculated from the viscosity measured in chloroform at 25°C. The same shall apply hereinafter).

When the above reaction was repeated by increasing the amount of sodium hydroxide to 4.0 gm, 49.7 gm of a polymer having an intrinsic viscosity of 0.18 was obtained, the yield being 40.7%.

From the foregoing, it is seen that the increase in amount of sodium hydroxide used does not produce improvement.

COMPARATIVE EXAMPLE 2

The procedure of Comparative Example 1 was repeated on a scale of 1/122 by employing a reactor equipped with a gas buret filled with oxygen, and the rate of oxygen absorption (reaction rate) was measured.

The change in the ratio of amount of absorbed oxygen to maximum amount of absorbed oxygen is shown in Table 1. Also see FIG. 1 for graphic comparison.

TABLE 1

| Reaction Time (Minutes) | Amount of Absorbed Oxygen (ml) | Ratio of Absorbed Oxygen Amount to Maximum AMount of Absorbed Oxygen (%) |
| --- | --- | --- |
| 0 | 0.0 | 0.0 |
| 1 | 21.5 | 15.7 |
| 2.5 | 68.5 | 50.0 |
| 5 | 107.2 | 78.3 |
| 10 | 128.6 | 94.0 |
| 20 | 134.0 | 98.6 |
| 30 | 137.0 | 100.0 |

In case polyphenylene oxide is formed by the oxidizing coupling of a phenol, the necessary and sufficient amount of oxygen for the reaction is ½ mole of the phenol. In this Comparative Example, however, during the reaction time of 30 minutes, oxygen was absorbed in an amout of 136% of the theoretical amount. This fact indicates that in this Comparative Example, side reaction were caused to occur. The amount of oxygen which is theoretically absorbable for complete reaction without side reactions is readily calculated by a worker in the art using ordinary rules of chemical formula calculations and need not be repeated herein.

COMPARATIVE EXAMPLE 3

The reaction was carried out in the same manner as in Comparative Example 1 without employing sodium hydroxide. More specifically, after 122 gm (1.0 mole) of 2,6-dimethylphenol had been dissolved in 2200 gm of 1,2-dichloroethane and 32.5 gm (0.1 mole) of "Salcomine" had been added to the solution, oxygen was passed into the mixture at 30°C. The temperature of the reaction system was raised gradually, but it was maintained at 30°C by cooling. During the above procedure there was formed 3,3',5,5'-tetramethyldiphenoquinone. After 5 hours had passed, the reaction mixture was filtered, and the filtrate was poured into 20 liters of methanol containing 2 liters of hydrochloric acid but precipitation of a polymer was not observed. The amount of diphenoquinone obtained was 12.3 gm, the yield being 10.1%.

COMPARATIVE EXAMPLE 4

Instead of the 1,2-dichloroethane solvent there was employed a mixed solvent of 1,2-dichloroethane and methanol. More specifically, 2.0 gm (0.05 mole) of sodium hydroxide was dissolved in 610 ml of methanol, and 1220 ml of 1,2-dichloroethane and 122 gm (1.0 mole) of 2,6-dimethylphenol were added to the solution. After addition of 32.5 gm (0.1 mole) of "Salcomine" oxygen was passed into the mixture. The catalyst was homogeneously dissolved in the reaction mixture. After the reaction had been continued for about 18 minutes, the polymer began to precipitate from the reaction liquor. After one hour's reaction the reaction product was recovered by filtration.

The amount of the precipitated polymer was 20.5 gm (yield being 16.8%) and the intrinsic viscosity of the polymer was 0.56. The filtrate was poured into 10 liters of hydrochloric acid and methanol to precipitate a low molecular weight polymer soluble in the filtrate. The amount of the resulting polymer was 6.2 gm (yield being 5.1%) and the intrinsic viscosity of the polymer was 0.07.

COMPARATIVE EXAMPLE 5

Comparative Example 4 was repeated on a scale of 1/122 by employing a reactor equipped with a gas buret filled with oxygen, and the oxygen absorbing rate was measured. The results are shown below in Table 2. See also FIG. 1 for comparison of results with invention Example 2.

TABLE 2

| Reaction Time (Minutes) | Amount of Absorbed Oxygen (ml) | Ratio to Maximum Amount of Oxygen Absorbed (%) |
| --- | --- | --- |
| 0 | 0 | 0 |
| 1 | 14.5 | 7.8 |
| 2.5 | 34.0 | 18.3 |
| 5 | 81.2 | 43.6 |
| 10 | 131.0 | 70.3 |
| 15 | 167.6 | 89.9 |
| 20 | 180.1 | 96.8 |
| 30 | 186.2 | 100.0 |

Also in this Comparative Example, oxygen was absorbed in an amount corresponding to 183.4% of the theoretical amount absorbable without side reactions. Thus, it indicated strongly that side reactions had occured.

COMPARATIVE EXAMPLE 6

7.0 gm (0.07 mole) of cuprous chloride was dissolved in 554 gm (7.0 moles) of pyridine, and then 91.5 ml of benzene and 915 ml of methanol were added to the solution. After addition of 122 gm (1.0 mole) of 2,6-dimethylphenol, oxygen was passed into the mixture at 30°C. After 5 minutes, the polymer began to precipitate. Small amounts of polymers precipitated at reaction times of 20 minutes, 40 minutes, 60 minutes and 120 minutes, respectively, were sampled. The intrinsic viscosity of each sample polymer was determined from the viscosity measured in chloroform at 25°C. The viscosity of each of the polymers sampled at the above reaction times was 0.143 and no increase of the molecular weight was observed.

COMPARATIVE EXAMPLE 7

32.1 gm of N,N'-ethylene-bis(salicylidene iminate) manganese was added to 2.5 liters of 1,2-dichloroethane and 122 gm of 2,6-dimethylphenol was added thereto. Oxygen was passed into the mixture under agitation while maintaining the temperature at 30°C. After three hours had passed, introduction of oxygen was stopped, and the reaction mixture was poured into methanol containing hydrochloric acid, but there was no polymer obtained.

The above experimental results show that when a compound of formula (2) given above has no group S, it cannot be a catalyst for the oxidative condensation of phenols. This result confirms the results reported in Journal of Organic Chemistry, 34 (2), 273 (1969).

COMPARATIVE EXAMPLE 8

Into a mixed liquor of 500 ml of methanol and 500 ml of pyridine was dissolved 12.5 gm of manganese chloride tetrahydrate, and 50 gm of 2, 6-dimethylphenol was further added thereto. Oxygen was passed into the mixture under agitation at 50°C. After 10 hours had passed, the reaction mixture was poured into 2 liters of methanol containing 20 ml of hydrochloric acid, but precipitation of a polymer was not observed.

COMPARATIVE EXAMPLE 9

10 ml of methanol containing 0.124 gm of manganese chloride and 0.213 gm of sodium methoxide was added to 60 ml of nitrobenzene, and the mixture was agitated for 5 minutes while passing oxygen therethrough. 30 ml of nitrobenzene containing 40 gm of 2,6-dimethylphenol was added to the above solution. Oxygen was passed through the mixture at 40°C under agitation. In about 130 minutes from the addition of 2,6-dimethylphenol, the equivalent amount of oxygen was absorbed. When additional three hours had passed, absorption of oxygen was not detected any more. The reaction mixture was poured into methanol containing a small amount of hydrochloric acid. The resulting precipitate was separated by filtration, washed and dried to obtain a white polymer of an intrinsic viscosity of 0.35 in a yield of 86.4%.

EXAMPLE 1

38.1 gm (0.1 mole – 10 mole %, based on the monomer) of a complex of N,N'-ethylene-bis(salicylidene iminate) manganese with ethylene diamine was added to 2.5 liters of benzene. The mixture was heated so that the temperature was maintained at 30°C. Then, 122 gm (1 mole) of 2,6-dimethylphenol was added to the mixture. Oxygen was passed through the mixture under agitation. Since generation of heat was caused, the cooling was effected so that the temperature was maintained at about 30°C. After 15 minutes had passed the introduction of oxygen was stopped. The reaction mixture was immediately filtered. The benzene solution was poured into 5.0 liters of a methanol solution containing 2 liters of hydrochloric acid to precipitate a white polymer. The precipitated polymer was washed with methanol and dried to obtain a polymer having an intrinsic viscosity of 0.480 (as measured in chloroform at 25°C, the same being applicable hereinbelow.), and the yield was 94.8%.

EXAMPLE 2

Example 1 was repeated on a scale of 1/122 by employing a reactor equipped with a gas buret filled with oxygen. The oxygen absorbing rate was measured. The results are given below in Table 3. Also see for graphic comparison FIG. 1.

As shown in the below table, in this Example 2, unlike in Comparative Example 2 or 5, oxygen was absorbed in an amount corresponding to about 101% of the theoretical amount, namely, almost in the equivalent amount. Thus, it is seen that very little, if any, side reactions occurred in this Example 2.

TABLE 3

| Reaction Time (Minutes) | Amount of Absorbed Oxygen (ml) | Ratio to Maximum Amount of Oxygen Absorbed (%) |
|---|---|---|
| 0 | 0 | 0 |
| 1 | 24.0 | 23.5 |
| 2 | 49.8 | 48.8 |
| 3 | 74.6 | 73.0 |
| 4 | 89.5 | 87.7 |
| 5 | 99.7 | 97.6 |
| 10 | 101.3 | 99.5 |
| 15 | 102.0 | 99.8 |
| 20 | 102.2 | 100.0 |
| 30 | 102.2 | 100.0 |

EXAMPLE 3

The reaction was carried out under the same conditions as in Example 1 by employing instead of benzen as in Example 1, the same amount of nitrobenzene. As a result, there was obtained a polymer having an intrinsic viscosity of 0.598 in an yield of 90.5%.

EXAMPLE 4

The reaction was carried out under the same conditions as in Example 1, except instead of benzene, the same amount of 1,2-dichloroethane was used. As a result, there was obtained a polymer having an intrinsic viscosity of 0.565 in an yield of 92.1%.

EXAMPLE 5

38.1 gm (0.1 mole –10 mole % based on the monomer) of a complex of N,N'-ethylene-bis(salicylidene iminate)manganese with ethylene diamine was dissolved in 10 liters of methanol and 1.5 liters of benzene was added thereto. After 122 gm of 2,6-dimethylphenol (1 mole) was added to the mixture while maintaining the temperature at 30°C. Oxygen was introduced while cooling to keep the reactor at about the 30°C temperature. After 4 minutes from the initiation of introduction of oxygen, the polymer began to precipitate. Since generation of heat was barely observed after 10 minutes had expired from time of introduction of the oxygen, the supplying of oxygen was stopped and the reaction mixture was then filtered. The resulting crude polymer was washed with methanol containing hydrochloric acid and then with methanol, followed by drying. As a result there was obtained a polymer having an intrinsic viscosity of 0.860 and in an yield of 90.0%.

In this Example, although the reaction time was shorter than in Comparative Example 5, a polymer of higher intrinsic viscosity was obtained in an higher yield.

EXAMPLE 6

7 gm (0.018mole–1.8 mole % based on the monomer) of a complex of N,N'-ethylene-bis(salicylidene iminate) manganese with ethylene diamine was dissolved in 0.6 liter of methanol and 1.2 liters of benzene was added thereto. Subsequent procedures were conducted as in Example 5, and a polymer was thus obtained having an intrinsic viscosity of 0.785 in an yield of 93.6%.

EXAMPLE 7

7 gm (0.02 mole–2 mole % based on the monomer) of a N,N'-ethylene-bis(salicylidene iminate) manganese with methoxide was used. The reaction was carried out in the same way as in Example 6, to obtain a polymer having an intrinsic viscosity of 0.876 in an yield of 96.1%.

EXAMPLE 8

Example 6 was repeated by employed as a catalyst 8 gm (0.018 mole–1.8 mole % based on the monomer) of a complex of N,N'-hexamethylene-bis(salicylidene iminate)manganese with ethylene diamine. As a result there was obtained a polymer having an intrinsic viscosity of 0.713 in an yield of 92.3%.

EXAMPLE 9

Example 6 was repeated by employing as a catalyst 8 gm (0.019 mole–1.9 mole % based on the monomer) of a complex of N,N'-phenylene-bis(salicylidene iminate) manganese with ethoxide. As a result there was obtained a polymer of an intrinsic viscosity of 0.665 in an yield of 91.6%.

EXAMPLE 10

Example 6 was repeated by employing as a catalyst 8.8 gm (0.02 mole–2 mole % based on the monomer) of a complex of N,N'-ethylene-bis(3-methoxysalicylidene iminate) manganese with ethylene diamine. A polymer was thus obtained, having an intrinsic viscosity of 0.860 and an yield of 96.9%.

EXAMPLE 11

Example 6 was repeated by employing as a catalyst 9 gm (0.02 mole–2 mole % based on the monomer) of a complex of N,N'-ethylene-bis(5-chlorosalicylidene iminate) manganese with ethylene diamine. A polymer was obtained having an intrinsic viscosity of 0.792 and an yield of 93.2%.

EXAMPLE 12

In 0.6 liter of methanol were dissolved 3.7 gm (0.015 mole–1.5 mole % based on the monomer) of manganese acetate tetrahydrate, 4.0 gm (0.015 mole) of N,N'-ethylene-bis(salicylidene imine) and 0.9 gm (0.015 mole) of ethylene diamine. Then, 1.8 gm (0.045 mole) of sodium hydroxide was dissolved in the resulting solution to form the complex of N,N'-ethylene-bis(-salicylidene imine)manganese with ethylene diamine, and 122gm (1 mole) of 2,6-dimethylphenol was further added thereto. Oxygen was passed through the mixture while maintaining the temperature at 30°C. When 20 minutes had elapsed from introduction of oxygen, the oxygen supply was turned off. Subsequent procedures were conducted in the manner of Example 6. A polymer was obtained having an intrinsic viscosity of 0.996 in an yield of 94.6%.

EXAMPLE 13

In 0.6 liter of methanol were dissolved 3.7 gm (0.015 mole–1.5 mole % based on the monomer) of manganese acetate tetrahydrate, 4.0 gm (0.015 mole) of N,N'ethylene-bis(salicylidene imine). Then 1.2 gm (0.03 mole) of sodium hydroxide was dissolved in the resulting solution, and 0.3 liter of methanol containing 0.8 gm (0.015 mole) of sodium methoxide was added thereto to form a complex of N,N'-ethylene-bis(-salicylidene imine)manganese with ethylene diamine and 1.2 liters of benzene were added and then 122 gm (1 mole) of 2,6-dimethyl phenol was further added thereto. Oxygen was supplied through the mixture while maintaining the temperature at about 30°C. Thereafter, subsequent procedures similar to Example 6 were conducted. A polymer was thus obtained, having an intrinsic viscosity of 1.12 in an yield of 91.8%.

EXAMPLE 14

7 gm (0.018mole–1.8 mole % based on the monomer) of a complex of N,N'-ethylene-bis(salicylidene iminate) manganese with ethylene diamine was added to a mixed solvent of 1.2 liters of benzene and 0.6 liter of methanol, followed by addition of 4.2 gm (0.03 mole) of tetramethylene diamine. Then, 122 gm (1 mole) of 2,6-dimethylphenol was added to the mixture and oxygen was passed through the mixture under agitation, while maintaining the temperature at about 30°C. Subsequent steps were conducted in the same manner as in Example 6. A polymer was obtained having an intrinsic viscosity of 0.631 and an yield of 90.2%.

EXAMPLE 15

Figure 2:
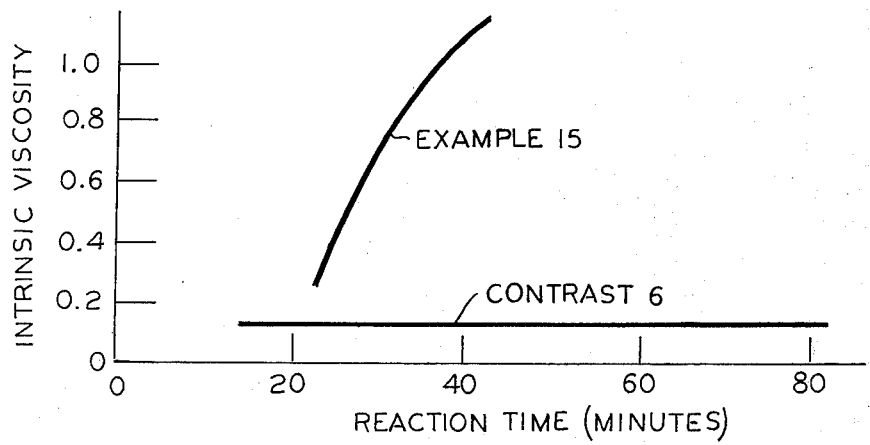
FIG. 2 is a graph illustrating the relationship between the intrinsic viscosity of the resulting polymers and the reaction times.

In 0.6 liter of methanol were dissolved 3.35 gm (0.0125 mole–1.25 mole % based on the monomer) of N,N'-ethylenebis(salicylidene imine) and 3.05 gm(0.0125 mole) of manganese acetate tetrhydrate. Then 1.52 gm (0.038 mole) of sodium hydroxide and 0.75 gm (0.0125 mole) of ethylene diamine were dissolved in the solution. Thus, methanol solution of ethylene diamine complex of N,N'-ethylene-bis(salicylidene imine) manganese was prepared. Thereafter, 122 gm (1mole) of 2,6-dimethylphenol was added to the solution and oxygen was passed through the resulting solution, while maintaining the temperature at about 30°C. Sampling was conducted during the reaction. At each sampling time, the intrinsic viscosity of the sample polymer was measured. It was found that in this Example, unlike in Comparative Example 6, the degree of increase in the intrinsic viscosity of the polymer was very conspicuous even though only a small amount of manganese was used, namely 1.25 mole % based on the 2,6-dimethylphenol. The results are shown in below Table 4. See also FIG. 2 for graphic comparison.

TABLE 4

| Reaction Time (Minutes) | Intrinsic Viscosity |
| --- | --- |
| 23 | 0.33 |
| 25 | 0.53 |
| 29 | 0.72 |
| 33 | 0.92 |
| 40 | 1.13 |

EXAMPLES 16–19

3.81 gm (0.01 mole% to 10 mole% based on the monomer) of a complex of N,N'-ethylene-bis(salicylidene iminate) manganese with ethylene diamine was dissolved in 0.1 liter of methanol and 0.15 liter of benzene was added to the solution and the resulting mixture was agitated. Then, 0.1 mole of a phenol indicated in the following Table 5, was added to the mixture. Thereafter, oxygen was passed through the mixture from a gas buret, while maintaining the temperature at about 30°C. When absorption of oxygen was not observed any more, the reaction was stopped. The reaction mixture was poured into oxygen containing methanol to precipitate solids completely. The resulting precipitate was washed with methanol and dried. Results of polymerization of phenols are shown in the below Table 5.

TABLE 5

| Example No. | Phenols Kind | amount (mole) | Polymers Yield (%) | Intrinsic Viscosity |
| --- | --- | --- | --- | --- |
| 16 | 2,6-diethylphenol | 0.1 | 91 | 0.76 |
| 18 | O-cresol | 0.1 | 80 | 0.44 |
| 19 | 2,6-dimethylphenol | 0.08 | 92 | 0.95 |

TABLE 5-continued

| Example No. | Kind | Phenols amount (mole) | Polymers Yield (%) | Intrinsic Viscosity |
|---|---|---|---|---|
| | O-cresol | 0.02 | | |

The foregoing description is intended only to be illustrative of the principles of this invention. Numerous modifications and variations thereof, would be evident to a worker in the art. All such modifications and variations are intended to be and are to be considered within the spirit and scope of this invention.

What is claimed is:

1. A process for preparing polypheylene polyphenylene oxides comprising the steps of oxidizing and condensing a phenol selected from the group consisting of O-cresol; 2,6-dimethylphenol; 2,6-diethylphenol; 2,6-dimethoxyphenol; 2,6-dipropenylphenol; 2,6-diphenylphenol; 2,4,6-trimethylphenol; 3-methoxyphenol and mixtures thereof; in the presence of a basic chelate compound expressed by the formula:

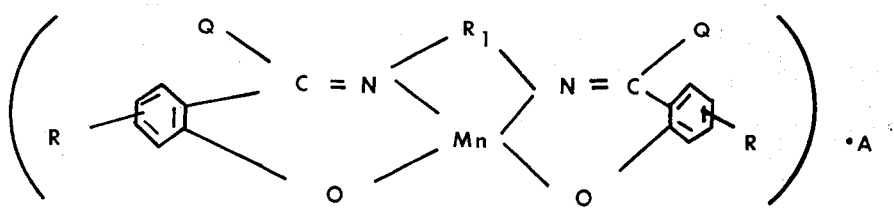

wherein $R_1$ stands for ethylene, hexamethylene and o-phenylene groups, Q selected for a hydrogen atom or a hydrocarbon group, R stands for a hydrogen atom, a hydrocarbon group, a hydrocarbon-oxy group, a halogen atom, an amino group, a nitro group, a hydroxyl group, and A stands for ethylene diamine, and in the presence of an organic solvent.

2. Process of claim 1, wherein said oxidizing and condensing is also in the presence of a basic compound selected from the group consisting of primary amines, secondary amines, tertiary amines, diamines and amides.

3. Process of claim 1, wherein said basic manganese chelate compound is selecte from the group consisting of ethylene diamine complexes, of N,N'-ethylene-bis(-salicylidene iminate)manganese, N,N'-ethylene-bis(3-methoxysalicylidene iminate) manganese and N,N'-ortho-phenylene-bis(5-chlorosalicylidene iminate) manganese.

4. Process of claim 1, wherein $R_1$ is ethylene, hexamethylene, or o-phenylene groups; Q is hydrogen atom or methyl group; R is hydrogen atom, chlorine atom, methyl group or methoxy group.

5. Process of claim 1, wherein said catalyst comprises from 0.1 mole% to 10 mole % of said phenol.

6. Process of claim 5, wherein said catalyst comprises at least 0.1mole percent.

7. Process of claim 6, wherein said catalyst comprises from 1 mole % to 3 mole %.

8. Process of claim 1, wherein said solvent is selected from the group consisting of benzene, toluene, xylene, anisol, chlorobenzene, dichlorobenzene, bromobenzene, nitrobenzene, benzonitrile, acetone, methylethylketone, ethyl acetate, amyl acetate, methanol, ethanol, propanol, isopropanol, butanol, chloroform, methylene chloride, 1,2-dichloroethane, methyl chloroform, 1,1,2,-trichloroethane, 1,1,2,2-tetrachloroethane, tetrahydrofuran, dioxane, dimethyl formamide, dimethyl acetamide, and hexamethyl phosphoamide.

9. Process of claim 2, wherein said solvent is a mixed solvent containing alcohol as a component and said basic compound is an amide.

10. Process of claim 2, wherein said basic compound is at least ½ mole of said chelate compound.

11. Process of claim 1, wherein said basic manganese chelate compound is ethylene diamine complexes of N,N'-hexamethylene-bis (salicylidene iminate) manganese or N,N'-O-phenylene-bis(salicylidene iminate)-manganese.

12. Process of claim 1, wherein said phenol is 2,6-dimethylphenol, said chelate compound is ethylene diamine complex of N,N'-ethylene-bis(salicylidene iminate)manganese, in a mixed solvent of alcohol and a solvent selected from the group consisting of benzene, toluene, xylene, chlorobenzene, chloroform, methylene chloride, 1,2,-dichlorothane, methyl chloroform, 1,1,2-trichloroethane, and 1,1,2,2-tetrachloroethane.

* * * * *